MULTI-APERTURE CORE SIGNAL TRANSLATING DEVICES

Filed Aug. 6, 1958

2 Sheets-Sheet 1

INVENTORS:
HAROLD W. ABBOTT,
JEROME J. SURAN,

BY Walter C Bernkopf
THEIR ATTORNEY.

INVENTORS:
HAROLD W. ABBOTT,
JEROME J. SURAN,
BY Walter C. Bernkopf
THEIR ATTORNEY.

3,079,593
MULTI-APERTURE CORE SIGNAL TRANSLATING DEVICES

Harold W. Abbott, Cohoes, and Jerome J. Suran, Syracuse, N.Y., assignors to General Electric Company, a corporation of New York Filed Aug. 6, 1958, Ser. No. 753,540
11 Claims. (Cl. 340—174)

This invention relates to multi-aperture core signal translating devices. More particularly, the invention relates to multipath magnetic core devices which may be used to perform complex logical operations which are commonly used, for example, in information handling systems.

Known magnetic devices including multi-aperture cores capable of performing a limited variety of logic operations are described by J. A. Rajchman and A. W. Lo in an article entitled "The Transfluxor" appearing at pages 321–332 of the "Proceedings of the IRE" of March 1956. Additional disclosures relating to multi-apertured magnetic devices are made in an application for U.S. Patent entitled "Signal Translating Device," Serial No. 632,342, filed January 3, 1957, now Patent No. 2,863,136 by the co-inventors of the present application and assigned to the assignee of the present invention. The devices disclosed therein are capable of performing gating and switching operations as well as performing "and" and "or" logic operations.

It is an object of this invention to provide multi-aperture core signal translating devices capable of performing a greater variety of logical operations, as well as being capable of simultaneously performing a greater number of such logical operations than prior known devices.

It is a further object of this invention to provide a multipath magnetic core device which may be used as an "exclusive or" gate.

It is a further object of this invention to provide a multipath magnetic core device capable of performing multiple logical operations of the "exclusive or" type.

It is a further object of this invention to provide a multipath magnetic core device which may be used as a parity checker.

It is a further object of this invention to provide a multipath magnetic core device which may be used as a binary half-adder.

It is a still further object of this invention to provide a multipath magnetic core device which may be utilized as a selective gate so as to provide an output only upon the application of a specific input digital code.

Briefly, in accordance with one aspect of the invention, a core of magnetic material having a nearly rectangular hysteresis loop is formed so as to have at least one set of three continuous apertures. The material between the central, i.e. intermediate, aperture and each of the outer apertures forms respectively a first and a second control leg. An input signal translating winding and an output signal translating winding are wound about central core members which bound the central aperture and include the control legs. Blocking windings are wound about the outer core member portions which surround the outer apertures adjoining the control legs. Upon sufficient energization of the blocking windings, a saturation flux is established in the magnetic path surrounding each of the outer apertures, so that the saturation flux established in the first control leg has an opposite rotational sense to the saturation flux established in the second control leg and transmission between the signal translating windings is blocked. Information signal windings may be wound about the core member surrounding each of the outer apertures, so that upon energization of such windings, there is a saturation flux established in the magnetic path surrounding the associated outer aperture which has a direction opposite to that established by the energization of the blocking windings. Such a device is able to perform logical operations of the "exclusive or" type, since energization of the information signal winding adjacent to either one of the outer apertures, will unblock a previously blocked core, while with energization of information input windings on the opposite outer apertures, the core is reblocked. Core devices with two sets of three apertures, such as a core formed with two parallel arranged sets of three apertures may be utilized to perform multiple logical functions. Such core devices may have a blocking winding wound so as to be in common with the outer apertures of both sets of apertures whereby upon energization of this winding, the control legs of each of the aperture sets will have the proper counter rotational flux saturation. Similarly the core devices may have a common signal translating input winding, wound so as to be in common with the central apertures of each set, and may have separate signal translating output windings wound about the peripheral leg portions adjacent to the central apertures. With the proper connection of the information signal windings and signal translating output windings, such core devices may perform multiple logic operations such as four-terminal odd-parity checking, half adding and selective gating functions.

While the specification concludes with claims particularly pointing out and distinctly claiming the subject matter which is regarded as the invention, it is believed that the invention will be better understood as the following description is taken in connection with the accompanying drawings in which:

FIG. 1 is a schematic plan view of a magnetic core configuration containing a mode of winding suitable for application as an "exclusive or" circuit.

FIGS. 2, 3, and 4 are flux diagrams showing the direction of flux distribution for the device of FIG. 1, respectively, after blocking; after application of information signal A; and after application of information signals A and B.

Figure 7:
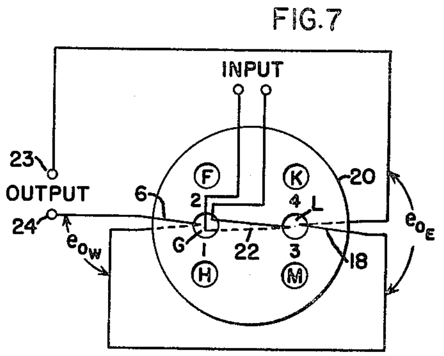
FIGS. 7 and 8 are schematic plan views of the magnetic core configuration with windings suitable for use as a four-terminal odd-parity checker, with FIG. 7 illustrating the placement of the signal translating windings, and FIG. 8 illustrating the blocking and logical information signal configuration for odd-parity checking.
Figure 8:
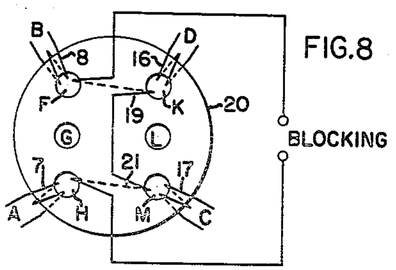

FIGS. 9–12 are flux diagrams for the device illustrated in FIGS. 7 and 8, showing the direction of flux distribution, respectively, after blocking; and after application of A; A and C; A, C and D information signals.

Figure 13:
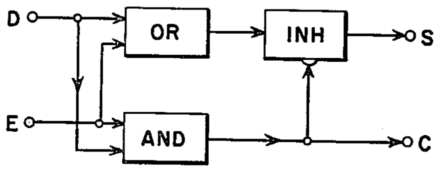

FIG. 13 is a functional representation of a half-adder.

Figure 14:
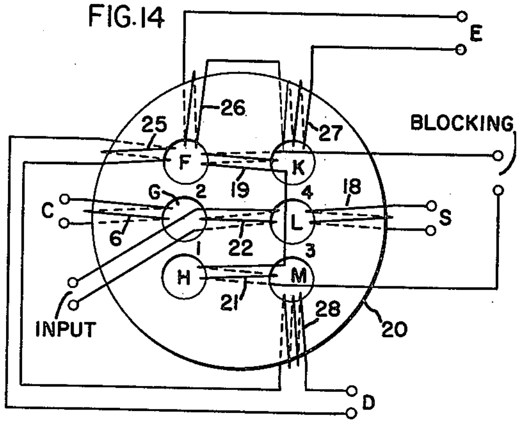

FIG. 14 is a schematic plan view illustrating a magnetic core configuration wound for utilization as a half-adder.

FIGS. 15–18 are flux diagrams for the devices of FIG. 14 showing the direction of flux distribution after blocking; after application of D; E; coincident D and E information signals.

Figure 19:
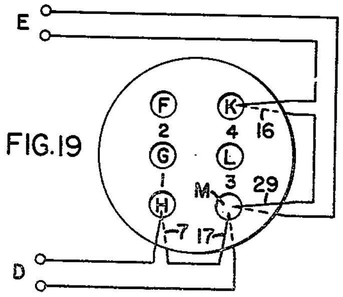

FIG. 19 is a schematic plan view illustrating a magnetic core wound to respond only to a "11" code.

Figure 20:
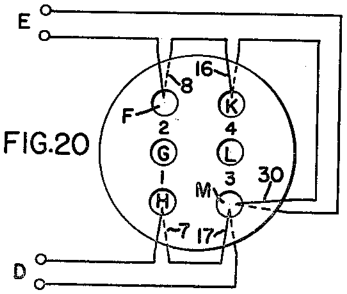

FIG. 20 is a schematic plan view illustrating a magnetic core wound to respond only to a "01" and "10" code.

Figure 21:
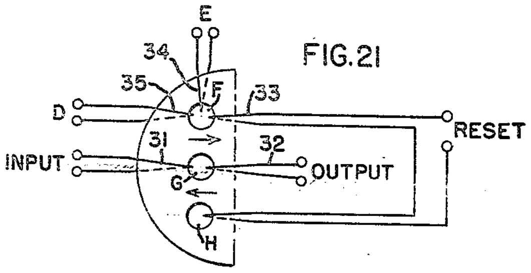

FIG. 21 is a schematic plan view of a magnetic core wound to respond only to a "00" code.

Figure 1:
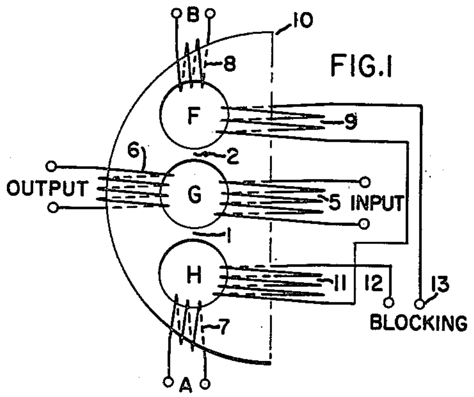
Figure 5:
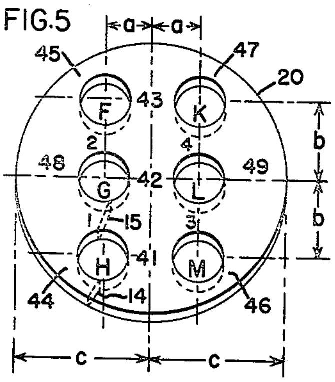
FIG. 5 is a perspective view of a magnetic core configuration of six apertures as suitable for use in the devices of the present invention.

Referring now to the drawings, and in particular to FIG. 1, there is shown a core 10 comprising three apertures F, G, and H. Core 10 may be either an independent three-hole core, or in accord with the subsequent discussion may form a portion of a multi-aperture core, for example, one-half of the six-aperture core illustrated in FIG. 5. The core is formed of a magnetic material having a substantially rectangular hysteresis characteristic, with the material of the core preferably being a molded ferrite ceramic, such as the well-known "General Ceramic S–1," but it will of course be understood that any material, ferrite or otherwise, having the above noted substantially rectangular magnetic hysteresis characteristic may be used. The core is preferably molded in the form of a flat slab of material which may, for example, have either a general circular outline, as shown in FIG. 5, or a generally rectangular outline or periphery as is illustrated in respect to other core configurations in our above-referenced application for U.S. patent. As will become apparent from the discussion below, however, neither a uniform slab thickness nor a particular overall shape is critical to the operation of the devices and alternative configurations will be apparent to those skilled in the art.

Figure 2:
Figure 3:
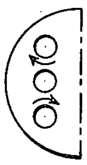
Figure 4:

In the configuration of FIG. 1, core 10 is provided with three apertures, F, G, and H, with G being defined as a central aperture and F and H being defined as the outer apertures. The three apertures may extend, as illustrated, along a common radial axis. The material of the core between the central aperture and the outer apertures form interior legs 1 and 2, termed "control legs." The blocking winding 9 is wound about a portion of the core member surrounding outer aperture F and blocking winding 11 is wound about the core member portion surrounding outer aperture H. Blocking windings 9 and 11 are serially connected to blocking input terminals 12 and 13 so that when a blocking pulse is applied to these windings, a flux path is established in the core material surrounding the outer apertures so that the control legs are saturated simultaneously in counter-rotational directions, as illustrated in FIG. 2. An input signal translating winding 5, adapted to be supplied with an alternating current signal input, is wound about the core member portion extending between the control legs on one side of the central aperture, while a signal translating output winding 6 is wound about the core member portion on the opposite side of the central aperture. Both of these windings may, however, be wound about the same core member portion, where the physical structure of the core makes this suitable. When the core is blocked, the alternating current input signal cannot induce flux changes in the closed magnetic path 1—2—1 and hence no alternating current output signal appears in the output signal translating winding. A first information signal winding 7 is wound about the core member portion surrounding outer aperture H, while a second information signal winding 8 is wound about the core member portion surrounding outer aperture F. These windings, respectively, have inputs labeled A and B in FIG. 1. If only winding 7 is energized by a signal applied to input A, the flux saturation state of control leg 1 is reversed, as shown in FIG. 3, so as to unblock the core and permit an A.-C. signal to be coupled to the output signal translating winding 6. Similarly if only winding 8 is energized by a signal applied to input B, the flux saturation state of control leg 2 is reversed and the core is unblocked to permit an A.-C. output. When both windings 7 and 8 are energized by signals applied to both inputs A and B the saturation flux states in both of the control legs, 1 and 2, are reversed and the core is reverse blocked, as illustrated in FIG. 4, so as to prevent signal transfer.

The above-described core operation makes it possible to utilize a plurality of three-aperture cores for complex logical operations such as binary half-adding, four-terminal input odd-parity checking, and selective gating in response to multi-digit binary codes. Instead of coupling separate three-aperture core sections to obtain such a result, it is possible to employ a single core with a plurality of three-aperture sets. FIG. 5 illustrates a six-aperture core topology which may include a core as illustrated in FIG. 1 and its mirror image. The core, 20, comprises two sets of three apertures which may extend along common radial axes, with the axes of the first set of apertures being substantially parallel to the axes of the second set of apertures. As illustrated, the first set contains central aperture G and outer apertures F and H, while the second set contains central aperture L and outer apertures K and M. The material between apertures G and H forms control leg 1 while the material between apertures F and G forms control leg 2. Correspondingly, the material between the apertures L and M forms control leg 3 and the material between apertures L and K forms control leg 4. The material between the first and second sets of apertures forms a central core leg, which for explanatory purposes is identified as comprising three leg portions as follows: Leg 41 extending between apertures H and M, leg 42 extending between apertures G and L, and leg 43 extending between apertures F and K. The apertures are bounded by a peripheral core member having portions enjoining the respective apertures numbered 44 through 49, with portions 44, 45, 46 and 47, respectively, bounding outer apertures H, F, M, and K, and with portions 48 and 47, respectively, bounding central apertures G and L.

For proper operation of the core, and in view of the cooperative flux path patterns, it is desirable that the minimum cross-sectional areas of the core legs have definite relationships to each other. The minimum cross-sectional area of a core leg lies in a plane perpendicular to the tangents of the surface bounding the core leg. Thus, as illustrated in FIG. 5, section 14 represents the minimum cross-sectional cores of leg 44. The relationships are stated below, with the designation A representing the minimum cross-sectional area of the leg portion having the corresponding number.

$$A_{41}>A_1+A_3$$
$$A_{43}>A_2+A_4$$
$$A_2<A_{42}, A_{48}, A_{49}$$
$$A_4<A_{42}, A_{47}, A_{46}$$
$$A_1<A_{42}, A_{44}, A_{48}$$
$$A_3<A_{42}, A_{46}, A_{49}$$

The above stated relationships show that the central core leg should have a cross-sectional area sufficiently large to accommodate a saturation flux surrounding adjacent outer apertures. In addition, it is indicated that the cross-sectional area of the control legs should be maintained within maximum limits to ensure that the saturation flux paths surrounding the outer apertures will establish a saturating flux in the control legs. It is desirable to maintain a relationship between the cross-sectional areas of a peripheral core member surrounding an outer aperture and the adjoining bounding control leg so that the former area is greater than, but less than twice the latter. Thus, the cross-sectional area of leg 44, illustrated as 14 in FIG. 5, should be greater than, but less than twice that, of the cross-sectional area of control leg 1, illustrated as 15. If this relationship is maintained, the flux in the peripheral member will be sufficient to properly saturate the adjacent control leg but insufficient to saturate the remote control leg. Such dimensioning removes the requirement for limiting the current magnitude of signals applied to the information signal windings in order to avoid the saturation of both control legs upon the application of an input to a single information signal winding. A disclosure is subsequently made of "and" type winding modes in which a plurality of information signal windings are wound about the peripheral core member, where a saturation flux is reached only when a plurality of such windings are energized. Current limiting of the energizing signal applied to such winding is generally required. A six-aperture core employed in one operative embodiment of the invention, which was operated up to an information signal pulse repetition rate of 20 kc. and with an A.-C. translating signal frequency of 60 kc., has dimensions as follows:

Core thickness=1/8 inch; the core radius, $c$, =13/30 the distance from the core radial axis to the common radial axis of each set of apertures, $a$ as illustrated in FIG. 5, =9/64 inch; the distance between the center of the central aperture to the center of the adjoining outer aperture in each set=7/32 inch, $b$ as illustrated in FIG. 5; the diameter of all apertures=3/16 inch. It should, of course, be understood, that these particular values are exemplary only and are not to be construed as critical limitations.

Figure 6:
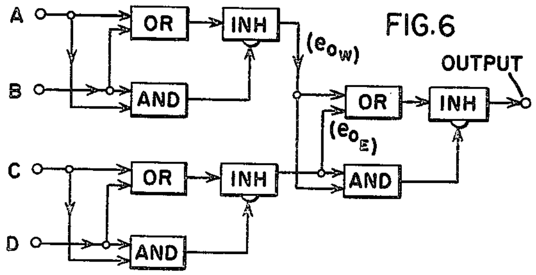
FIG. 6 is a logical block diagram for a four-terminal odd-parity checker.

The above-described six-hole core configuration may be utilized to perform a variety of multiple logical operations including that of the "exclusive or" type, and may thus be employed as a four-terminal odd-parity checker. In such a checker inputs may be applied to four information signal input windings and an output is obtained only if an odd number of inputs is applied. FIG. 6 illustrates a functional block diagram of the elemental logical requirements for such a circuit. It may be seen that a total of nine "or," and "and," and "inhibit" circuits are required for the logical operation. Prior art circuits, therefore, required the utilization of a large number of components, as may for example be seen from the description of one such circuit in an article entitled "Directly Coupled Transistor Circuits" by R. H. Beter et al. appearing at pages 132–136 of volume 28, No. 6 of "Electronics," June 1955.

Figure 9:
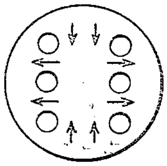

As shown in FIG. 7, a signal translating input winding 22 is wound about the central core leg portion which borders the central apertures, 42 as illustrated in FIG. 5. A signal translating output winding is wound about each of the peripheral core members enjoining the central apertures, with winding 6 wound about core member 48 and winding 18 wound about core member 49. As illustrated in FIG. 8, a blocking winding is wound about each of the central core leg portions bordering adjacent outer apertures. These windings, 19 wound about leg portions 43 and 21 wound about leg portion 41 are serially connected to the blocking signal input so that upon application of a blocking pulse a saturation flux state, corresponding to that illustrated in FIG. 9, is created in which the control legs of each set of apertures are saturated in counter-rotational directions. Information signal windings are wound about the peripheral core member portions surrounding the outer apertures, with windings 7, 8, 16 and 17 being wound, respectively, about peripheral portions 44, 45, 47 and 46, so as to provide information signal inputs A, B, D and C. The above-described winding mode may be generally utilized for the subsequently described six-hole core devices. It should be noted that devices having a greater number of apertures and two three-hole core devices may be utilized in lieu of the illustrated six-hole core configuration. As illustrated in FIG. 7, the four-terminal odd-parity checker requires the additional series connection of the signal translating output windings 6 and 18 in a series-bucking combination so that A.-C. signal induced by flux changes in the closed path 42—3—48—1—42, as illustrated in FIG. 5 cancels the A.-C. signal induced by simultaneous flux changes in the path 42—4—49—3—42. Consequently, with the windings 6 and 18 thus connected a signal output will occur only when one side of the six-hole core is blocked.

Figure 11:
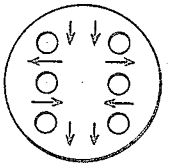
Figure 12:
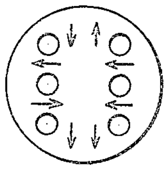
Figure 10:
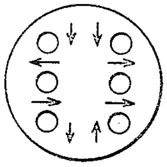

In operation of the device, a blocking signal may be initially applied which will set the flux saturation states in legs 1 and 4 in counter-rotational directions to the flux states in leg 3, as illustrated in FIG. 9. If an information signal is applied to input A of winding 7 the saturation flux of control leg 1 is reversed, as illustrated in FIG. 10, and the left hand side of the core 20 is unblocked so that the A.-C. input signal applied to signal translating input winding 22 generates an output signal indicated as $e_{0_W}$ at the output of winding 6. Since the right side of the core is blocked, the total A.-C. signal output appearing at output terminals 23 and 24 will also substantially equal the signal $e_{0_W}$. However, if pulses are applied to both inputs A, of winding 7, and C, of winding 17, the flux saturation states in both legs 1 and 3 are reversed, as shown in FIG. 11, and consequently, both sides of the core are simultaneously unblocked. Signals are then induced in both output windings 6 and 18; but, due to the series-bucking connection of the output windings, the net A.-C. output at terminals 23 and 24 is zero. Similar consideration of all possible flux states in the control legs of the odd-parity-check core circuit shows that an A.-C. signal output occurs at terminals 23 and 24 only when an odd number of the control windings are excited. For example, FIG. 12 indicates the flux states occurring when pulses are applied to the A, C and D inputs of windings 7, 17 and 16 when one side of the core is unbalanced and an output occurs. In further explanation, it may be seen with the aid of the logical block diagram of FIG. 6 that the odd-parity function may be synthesized by interconnecting three "exclusive or" circuits. Comparison of the six-hole logic core illustrated in FIGS. 5, 7, and 8 with the three-aperture set core of FIG. 1 shows that the former combines two "exclusive or" configurations in a single core disk. The third "exclusive or" function required for the parity checking operating is provided by the interconnection of the two signal translating output windings. It should be noted that the core circuits disclosed have inherent memory, since the A.-C. output signal persists until the core is reset by a blocking pulse.

The above-described six-aperture topology may also be employed in a logical configuration which is capable of binary half-adding operations. Half-adder circuits, which are commonly employed in information handling systems, are devices in which two digits are added. Thus, a half-adder has two inputs to which the addend and the augend are, respectively, applied and has two output terminals to supply, respectively, the proper sum and carry digit. The binary addition table shown below shows the sum and carry for each possible combination of two binary digits so as to aid in a discussion of half-adder operation.

| Addend A | Augend B | Sum S | Carry C |
|---|---|---|---|
| 0 | 0 | 0 | 0 |
| 0 | 1 | 1 | 0 |
| 1 | 0 | 1 | 0 |
| 1 | 1 | 0 | 1 |

A binary half-adder may be functionally represented by the block diagram illustrated in FIG. 13. The circuit has two inputs, D, E, and two outputs, S, the sum, and C, the carry. With the aid of the above table it may be seen that the circuit requirements are as follows: The carry output should appear only with the application of inputs to the D and E inputs, while a sum output should appear only with the application of an input to either D or E. Conventional circuitry for such a half-adder requires a plurality of elements, as may be seen from the discussion in the previously referenced article entitled "Directly Coupled Transistor Circuits."

Figure 15:
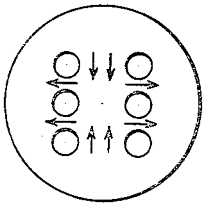
Figure 16:
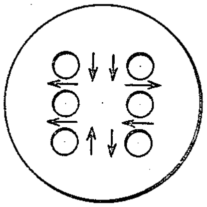
Figure 17:
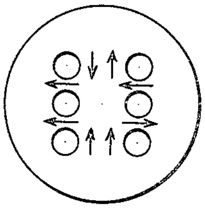
Figure 18:
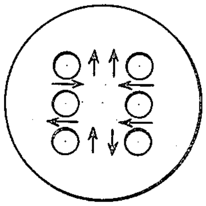

FIG. 14 illustrates a single six-hole core device which will perform the half-adder logic operation. It should be noted that both the signal translating input winding 22 and the blocking windings 19 and 21 may be wound and connected in the same manner as the corresponding windings of the odd-parity checker. The flux saturation states established after application of a blocking signal, as shown in FIG. 15, corresponds to that for the odd-parity checker, as shown in FIG. 9. The signal translating output windings 6 and 18 are separate and are connected to output terminals so as to provide outputs C and S, respectively. It should be noted that four information signal windings, 25, 26, 27 and 28 are provided, and that windings 27 and 28 have twice the number of turns of windings 25 and 26. Windings 26 and 27, wound about peripheral core legs 45 and 47, as illustrated in FIGS. 5 and 14, are connected in series to the input E. Similarly, windings 25 and 28 wound, respectively, about peripheral core member legs 45 and 46, are serially connected to input D. Since winding 27 has twice the number of turns of winding 26, a signal applied at input E will generate sufficient magnetomotive force in the closed path 47—43—4—47 to reverse the flux saturation state in control leg 4, but the magnetomotive force generated in the closed path 45—43—2—45 will be insufficient to reverse the flux saturation state in control leg 2, as shown in FIG. 17. Similarly, since winding 28 has twice the number of turns of winding 25, a signal applied to input D will reverse the flux saturation state in control leg 3 but not in control leg 2, as shown in FIG. 16. Thus, either a signal at E or D will unblock the right side of the core but will leave the left side of the core blocked, so that a signal output will appear only at S, from signal translating output winding 18. Coincident pulses at both D and E will generate additive magnetomotive forces in leg 45 with the result that the flux saturation states in control legs 2, 3 and 4 will be reversed. The net result of such a pulse coincidence is to unblock the left side but to reblock the right side of the device, as shown in FIG. 18, and thus cause an A.-C. output signal to appear at output C of signal translating output winding 6.

The six-aperture core devices may also be employed as selective gating devices for utilization in various types of information handling or selective calling systems. The devices may thus be connected to respond to only a given two digit input signal, so that an A.-C. signal output occurs only after a desired one of four possible binary codes is applied to the two input terminals. A selective gating core which responds only to a "11" code is illustrated in FIG. 19 and has signal translating windings and blocking windings wound in the same manner as for the odd-parity checker shown in FIGS. 7 and 8. Information signal windings 7 and 17, which are wound, respectively, about peripheral legs 44 and 46 are serially connected to information signal input D. Information signal windings 16 and 29, are, respectively, wound about peripheral legs 47 and 46, and are serially connected to information signal input E. All of these windings may have the same number of turns. Thus, an input applied to signal input D will reverse the flux saturation states of control legs 1 and 3 and will unblock both sides of the core. Since the two signal translating output windings are connected in a series-bucking arrangement, there will be no net A.-C. output. If an input is applied only to information input E, the left side of the core will be unaffected and the right side will be reblocked so that there will also be no A.-C. output. However, if both D and E inputs are energized, the left side of the core is unblocked, while the right side remains blocked with a resulting net A.-C. signal output.

A "10" or "01" selective gating core, as illustrated in FIG. 20, also has the signal translating and blocking winding configurations of the odd-parity checker, illustrated in FIGS. 7 and 8. Information input windings 8, 16 and 30 wound, respectively, about peripheral legs 45, 47 and 46, are serially connected to information signal input E, while windings 7 and 17 wound respectively about peripheral legs 44 and 46 are serially connected to information signal input D. If only information input E is energized, the flux saturation states in legs 2, 3, and 4 are reversed so that only the left side of the core is unblocked with a resulting net A.-C. output. If only information input D is energized, the flux saturation states in legs 1 and 3 are reversed and both sides of the core are unblocked and no net A.-C. output results. If both input D and E are energized, both sides of the core are reblocked and no net A.-C. output results. It may, of course, be seen that the device may operate as a "01" or "10" responsive device depending upon the selection of signal inputs E and D.

To complete the requirements of a selective system, a "00" core is illustrated in FIG. 21. This device has a reset winding, 33, which upon being energized unblocks the core, and has signal translating input and output windings, 31 and 32, wound about core member portions surrounding central aperture G so that an A.-C. output signal appears at the output terminal subsequent to energization of winding 33. Since information signal input windings 34 and 35 connected respectively to signal inputs E and D are wound about a common core member surrounding one of the outer apertures, the application of any combination of input signals will cause the core to block and cut off the A.-C. output signal.

It may be seen that multi-digit systems of great capacity may be obtained by cascading a plurality of the above-described selective gating controls. Thus, if a capacity of N channels is required the number of selective gating cores, *m*, which are required is $$m = \tfrac{1}{2} \log_2 N$$

thence, a 64 call system requires three selective gating cores. In an experimental call system utilizing six-hole selective gating cores, the typical number of turns around each leg was in the order of 50 and typical current requirements for reversal of the flux saturation states in the control legs were in the order of 30 ma., peaks. The A.-C. signal frequency was approximately 50 kc. and the information pulse rate was varied between 0–20,000 p.p.s. The above parameters are only stated by way of example and do not express critical limitations.

It is apparent that a variety of basic and multiple operations of Boolean algebra and symbolic logic can be instrumented by the devices of the present invention and that more complex networks may be devised by utilizing the disclosed devices in accordance with well known techniques of logical network design.

While the principles of the invention have now been made clear in illustrative embodiments, there will be immediately obvious to those skilled in the art many modifications in structure, arrangement, proportions, the elements and components, used in the practice of the invention and, otherwise, which are particularly adapted for specific environment and operating requirements without departing from those principles. The appended claims are therefore intended to cover and embrace such modifications, within the limits only of the true spirit and scope of the invention.

What we claim as new and desire from the Letters Patent of the United States is:

1. A signal translating device comprising a core constructed of a material having a substantially rectangular magnetic hysteresis characteristic, said core having formed therein at least one set of three apertures so as to comprise a central aperture and first and second outer apertures, the material between said central aperture and said first outer aperture forming a first control leg, and the material between said central aperture and said second outer aperture forming a second control leg, the material surrounding said central aperture including said control legs forming a central core member portion, the material surrounding said first outer aperture adjoining said first control leg forming a first outer core member portion, the material surrounding said second outer aperture adjoining said second control leg forming a second outer core member portion, a plurality of signal translating windings wound on said central core member portion, blocking winding means for saturating said control legs in opposite rotational senses relative to a magnetic circuit in said central core member portion to block signal transfer between said signal translating windings, information signal winding means wound about at least two of the outer core member portions for reversing the direction of the saturation flux in an associated control leg in response to current passed through said means, so as to unblock signal transfer between said signal translating windings.

2. A signal translating device comprising a core constructed of a material having a substantially rectangular magnetic hysteresis characteristic, said core having formed therein at least one set of three apertures so as to comprise a central aperture and first and second outer apertures, the material between said central aperture and said first outer aperture forming a first control leg, and the material between said central aperture and said second outer aperture forming a second control leg, the material surrounding said central aperture including said control legs forming a central core member portion, the material surrounding said first outer aperture adjoining said first control leg forming a first outer core member portion, the material surrounding said second outer aperture adjoining said second control leg forming a second outer core member portion, a plurality of signal translating windings wound on said central core member portion, blocking winding means wound on said first and second outer core member portions and upon current energization adapted to block signal transfer between said first and second signal translating path windings by saturating said control legs in opposite rotational senses relative to a magnetic circuit bounding said central aperture, information signal winding means wound about at least two of said first and second outer core member portions for reversing the direction of the saturation flux in an associated control leg in response to current passed through said means, so as to unblock signal transfer between said signal translating windings.

3. A signal translating device comprising a core constructed of a material having a substantially rectangular magnetic hysteresis characteristic, said core having formed therein at least one set of three apertures so as to comprise a central aperture and first and second outer apertures, the material between said central aperture and said first outer aperture forming a first control leg, and the material between said central aperture and said second outer aperture forming a second control leg, the material surrounding said central aperture including said control legs forming a central core member portion, the material surrounding said first outer aperture adjoining said first control leg forming a first outer core member portion, the material surrounding said second outer aperture adjoining said second control leg forming a second outer core member portion, a plurality of signal translating windings wound on said central core member portion, a blocking winding wound on said outer core member portions and upon current energization adapted to block signal transfer between said first and second signal translating path windings by saturating said control legs in opposite rotational senses relative to a magnetic circuit bounding said central aperture, first information signal input winding means wound about said first outer core member portion, second information signal input winding means wound about said second outer core member portion, said first means upon energization being constructed to reverse the direction of the saturation flux in said first control leg, and said second means upon energization being constructed to reverse the direction of the saturation flux in said second control leg.

4. A signal translating device comprising first and second core sections constructed of a material having a substantially rectangular magnetic hysteresis characteristic each of said sections having formed therein one set of three apertures so as to comprise a central aperture and first and second outer apertures, the material between said central aperture and said first outer aperture forming a first control leg and the material between said central aperture and said second outer aperture forming a second control leg, the material surrounding said central aperture including said control legs forming a central core member portion, the material surrounding said first outer aperture adjoining said first control leg forming a first outer core member portion, the material surrounding said second outer aperture adjoining said second control leg forming a second outer core member portion, an input signal translating and an output signal translating winding wound on said central core member portion, means for jointly energizing said input signal translating winding of said first and second sections, blocking winding means for saturating said control legs in opposite rotational senses relative to a magnetic circuit in said central core member portion to block signal transfer between said signal translating windings, means for jointly energizing the blocking winding means of said first and second section, information signal winding means wound about at least two of the outer core member portions being adapted to reverse the direction of the saturation flux in an associated control leg in response to current passed through said means so as to unblock signal transfer between said signal translating windings.

5. The device described in claim 4, wherein the output signal translating windings of said first and second sections are connected in series bucking relationship to common output signal translating means.

6. The device described in claim 4, wherein the output signal translating windings of said first and said second sections are connected in series bucking relationship to common output signal translating means, information signal winding means are wound about each of said outer core members of said two sections, and four information signal input means are connected respectively to one of said information signal winding means.

7. The device described in claim 4, wherein the output signal translating windings of said first and second sections are connected in series bucking relationship to common output signal translating means, first information signal input means connected serially to first and second information signal windings wound respectively about the first outer core member portions of said first and second sections, and second information signal input means connected serially to third and fourth information signal windings wound respectively about the first and second outer core member portions of said second section.

8. The device described in claim 4, wherein the output signal translating windings of said first and second sections are connected in series bucking relationship to common output signal translating means, first, second, and third information signal windings wound respectively about the second outer core member portions of said first and second sections, and the first outer core member portion of said second section, first information signal input means connected serially to said first, second, and third information signal windings, fourth and fifth information signal windings wound respectively about the first outer core member portions of said first and second sections, second information signal input means connected serially to said fourth and fifth information signal windings.

9. The device described in claim 4 wherein first and second information signal windings are wound respectively about the second outer core member portions of said first and second sections, first information signal input means connected serially to said first and second information signal windings, third and fourth information signal windings wound respectively about the second outer core member portion of said first section and the first outer core member portion of said second section, second information signal input means connected serially to said third and fourth information signal windings, said first and third information signal windings being connected so that energization of either winding is insufficient but energization of both said windings is sufficient, to reverse the direction of the saturation flux in the second control leg of said first section.

10. A signal translating device comprising a core constructed of a material having a substantially rectangular magnetic hysteresis characteristic, said core having formed therein a first set and a second set of three apertures, each of said sets of apertures comprising a central aperture and first and second outer apertures, the material between the central aperture and the first outer aperture forming a first control leg, and the material between the central aperture and the second outer aperture forming a second control leg, the material between said first and second sets of apertures forming a central core leg, the material surrounding said first and second sets of apertures forming a peripheral core member, first signal translating winding means wound about the portion of the central core leg adjoining the central aperture of the first and second sets, second signal translating windings means wound about at least one of the portions of the peripheral core member adjoining the central apertures, blocking winding means adapted to block signal transfer between said first and said second signal translating winding means, means to apply current through said blocking winding means to saturate the control legs of each of said sets in opposite rotational senses relative to the magnetic circuit bounding said central aperture, at least two information signal winding means placed about at least two portions of the peripheral core member adjacent to said outer apertures, means to apply information signals selectively to said information winding means to reverse the direction of the saturation flux in an associated control leg in response to said information signals passed through said information winding means to thereby unblock said core.

11. A signal translating device comprising a six-hole core constructed of a material having a substantially rectangular magnetic hysteresis characteristic, said core having formed therein a first set and a second set of three apertures, each of said sets of apertures extending along a substantially common radial axis so as to comprise a central aperture and first and second outer apertures, the material between the central aperture and the first outer aperture forming a first control leg, and the material between the central aperture and the second outer aperture forming a second control leg, the material between said first and second sets of apertures forming a central core leg, the material surrounding said first and second sets of apertures forming a peripheral core member, an input signal translating winding wound about the portion of the central core leg adjoining the central aperture of the first and second sets, first and second output signal translating windings respectively wound about the portions of the peripheral core member adjoining the central apertures, blocking winding means adapted to block signal transfer between said input signal translating winding and said output signal translating windings, means to apply current through said blocking winding means to saturate the control legs of each of said sets in opposite rotational senses relative to the magnetic circuit bounding said central aperture, at least two information signal winding means placed about at least two portions of the peripheral core member adjacent to said outer apertures, means to apply information signals selectively to said information winding means to reverse the direction of the saturation flux in an associated control leg in response to said information signal passed through said information winding means to thereby unblock said core.

References Cited in the file of this patent

UNITED STATES PATENTS

| | | |
|---|---|---|
| 2,818,555 | Lo | Dec. 31, 1957 |
| 2,919,430 | Rajchman | Dec. 29, 1959 |
| 2,962,719 | Rajchman | Nov. 29, 1960 |

OTHER REFERENCES

Publication I: Rajchman and Lo: "The Transfluxor," Proceedings of the IRE, March 1956, pp. 321–332, Fig. 16 relied on.